May 14, 1929.  H. J. HARROLD  1,713,434
SCREW DRIVER
Filed Dec. 26, 1928
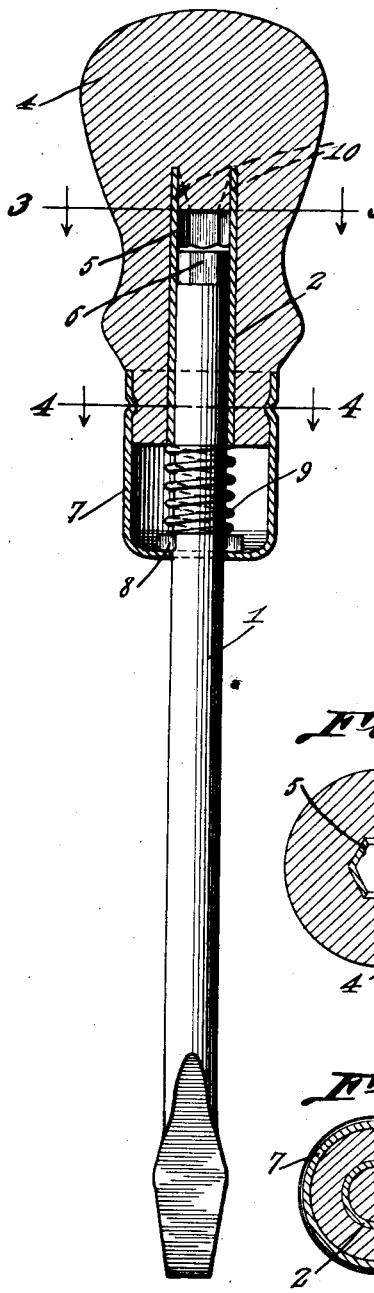
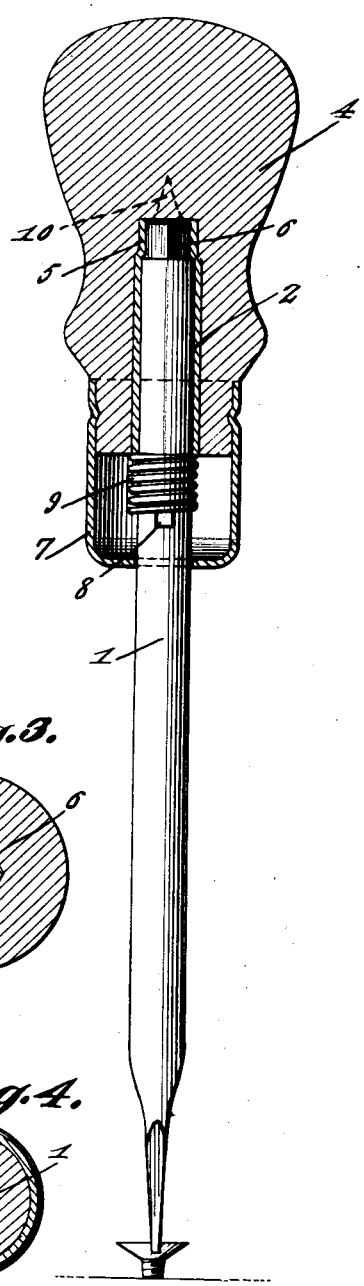
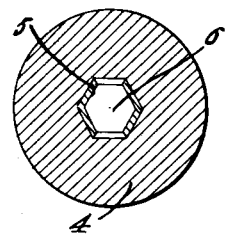
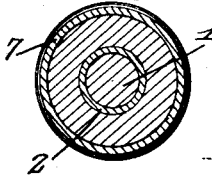
H. J. Harrold, INVENTOR
BY Victor J. Evans
ATTORNEY Patented May 14, 1929.

1,713,434

UNITED STATES PATENT OFFICE.

HARVEY J. HARROLD, OF COLUMBIANA, OHIO.

SCREW DRIVER.

Application filed December 26, 1928. Serial No. 328,384.

This invention relates to a screw driver, the general object of the invention being to provide means whereby the handle of the screw driver can be readily turned in one direction or the other without moving the shank so as to properly position the hand to give the shank a turning movement in an opposite direction to turn a screw or to loosen a screw without sliding the hand on the handle of the screw, which eliminates a retrograde movement of the shank and screw and danger of the blade being forced from the kerf of the screw.

This invention also consists in certain other features of construction and in the combination and arrangement of the several parts, to be hereinafter fully described, illustrated in the accompanying drawing and specifically pointed out in the appended claim.

In describing the invention in detail, reference will be had to the accompanying drawing wherein like characters denote like or corresponding parts throughout the several views, and in which:—

Figure 1 is a sectional view through the handle part of a screw driver, showing the shank in elevation.

Figure 2 is a similar view but taken at right angles to Figure 1 and showing the parts in a different position.

Figure 3 is a section on line 3—3 of Figure 1.

Figure 4 is a section on line 4—4 of Figure 1.

In these views, the numeral 1 indicates the shank of the screw driver which extends into a sleeve 2 placed in a hole formed in the lower part of the handle 4 of the screw driver, the parts being so arranged that the shank can have sliding movement in the sleeve. The upper end of the sleeve is reduced and formed of hexagonal shape in cross section, as shown at 5, and the upper end of the shank is similarly formed, as shown at 6, so that when the handle is pressed down upon the shank, the end 6 of the shank, entering the part 5 of the sleeve will lock the shank and sleeve together so that the shank will be turned with the handle when the handle is turned. However, when the part 6 is out of engagement with the part 5, the handle can be turned on the shank without moving the shank.

A ferrule 7 is connected with the lower end of the handle and surrounds a portion of the shank, said shank having a pin 8 passing therethrough and a coil spring 9 is placed on that part of the shank inside the ferrule and bears against the end of the sleeve and the pin 8 and tends to hold the parts with the pin 8 resting against the ferrule and with the part 6 out of the part 5, so that the handle has relative movement to the shank.

The upper end of the sleeve is formed with the pointed projections 10 which are adapted to be driven into the handle so as to hold the sleeve in place.

From the foregoing it will be seen that by depressing the handle on the shank, the parts will be locked together so that the shank will be turned when a turning movement is imparted to the handle and then by relieving the pressure on the handle, the spring will raise the same so that the handle can be given a retrograde movement to properly position the hand in order to give the shank another turn and this can be kept up until the screw is driven home or removed. Thus this invention enables one to use the screw driver without danger of turning the shank and screw in a wrong direction in properly positioning the hand for a new turning movement and it also eliminates danger of the blade being pulled from the kerf of the screw in securing this new position of the hand.

It is thought from the foregoing description that the advantages and novel features of the invention will be readily apparent.

It is to be understood that changes may be made in the construction and in the combination and arrangement of the several parts, provided that such changes fall within the scope of the appended claim.

What I claim is:—

A device of the class described comprising a handle having a centrally arranged hole in its lower part, a sleeve fitting in the hole and having pointed projections at its inner end penetrating portions of the handle, said sleeve being of circular form and having a non-circular inner end portion, a shank having its upper end fitting in the sleeve, with its upper end of non-circular form to fit into the non-circular part of the sleeve, a pin passing through the shank with its ends projecting therefrom, said pin being spaced from the lower end of the handle, a coil spring on the shank bearing against the outer end of the sleeve and against the projecting portions of the pin and a ferrule connected with the lower end of the handle and enclosing the spring and pin carrying part of the shank, with the projecting portions of the pin engaging the inner face of the bottom of the ferrule.

In testimony whereof I affix my signature.

HARVEY J. HARROLD.